J. Marsh.
Excavator.
No. 83,296. Patented Oct. 20, 1868.
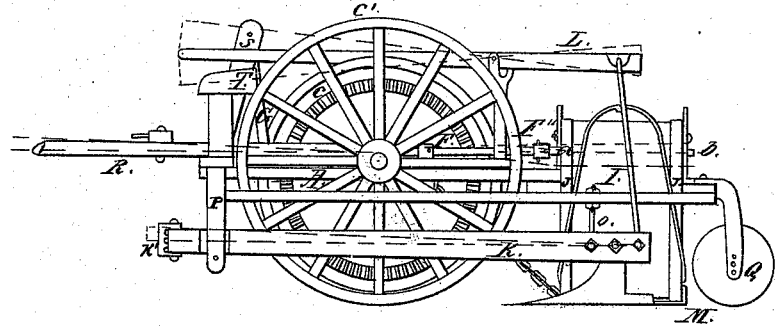
Fig: 1.
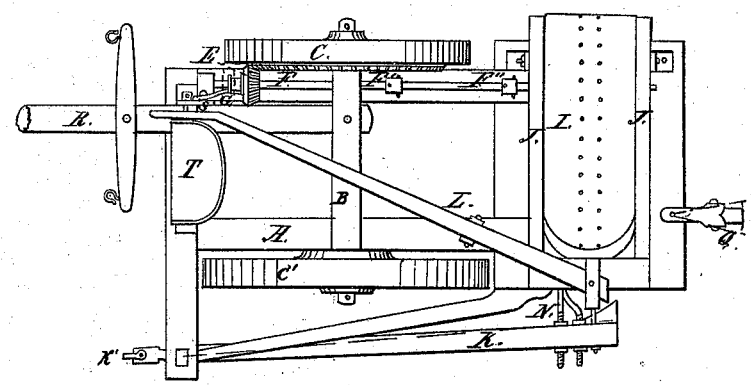
Fig: 2.
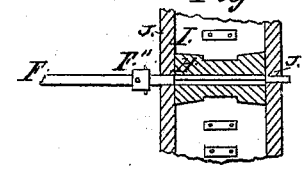
Fig: 3.
Witnesses:
E. Ross
Ada Crosiar
Inventor.
John Marsh

UNITED STATES PATENT OFFICE.

JOHN MARSH, OF SENECA, ILLINOIS.

Letters Patent No. 83,296, dated October 20, 1868; antedated September 28, 1868.

IMPROVED DITCHING-MACHINE.

The Schedule referred to in these Letters Patent and making part of the same.

*To all whom it may concern:*

Be it known that I, JOHN MARSH, of Seneca, in the county of Grundy, in the State of Illinois, have invented a new and improved Ditching and Grading-Machine; and I do hereby declare that the following is a full and exact description thereof, reference being had to the accompanying drawings, and to the letters of reference marked thereon.

The nature of my invention consists in constructing a ditching and grading-machine, supported on two main wheels, of which one is larger than the other, the one on the plow-side being the largest, so that the machine, in making a ditch, will assume a level position, or nearly so.

My invention also consists in so simplifying the gearing, that a single shaft will drive the apron direct from the main wheel.

My invention further consists in providing a toggle-joint to the shaft driving the apron, so that the latter can be raised or lowered at will while at work.

To enable others skilled in the arts to make and use my invention, I will proceed to describe its construction and operation.

Figure 1, in the drawings, is a vertical plan.
Figure 2 is a horizontal plan.
Figure 3 is a section through *a b*, fig. 1.

I construct a frame, A, of timber, across which passes the axle-tree B, having on it the two main wheels C and C'.

The wheel C is smaller than the wheel C', in order that the machine, when working or digging out a ditch, may be held more level. By this means, also, a narrower machine can be used than if the two wheels were alike.

The wheel C has cast or bolted to it, a bevel-cog rim, D, into which meshes a bevel-pinion, E.

This pinion E slides on a shaft, F, by means of a lever, G, operated by hand.

The shaft F drives the toothed roller H, over which passes the apron I.

The apron I has a series of slats riveted to it, which engage into the teeth of the roller H, and thus carry along the apron I.

The roller H is not straight, but thinned in the middle, as seen in fig. 3, in order that the apron I, passing over it, may be scooping in the middle, so as to keep the dirt better together, and prevent it from rolling off on each side.

The frame J, which supports the apron I, is movable at each end, and to give the apron its required motion in its different positions, the shaft F has two universal joints, one at F' and one at F''.

The plow K is of the ordinary kind, and has at the forward end of the beam a clevis, K', with notches, so that the pitch of the plow can be graduated.

The lever L enables the driver to raise the plow K out of the ground, and also to raise the apron I from the ground.

At the same time the driver is enabled to give pressure to the plow K, by lifting up the forward end of the lever L.

A protecting-shoe, M, is adapted under the lower end of the apron-frame J, to prevent the apron I from wearing upon the ground.

The plow K is braced by a double brace, N, which slides along a guide, O, and by means of which the inclination of the plow can be regulated.

There is also a brace, P, through which the plow-beam K passes, and which allows the forward end to rise and fall, one team being hitched to the end of the beam K.

A caster-wheel, Q, is adapted at the rear end of the machine, in such a manner that the machine can turn around in a small space.

The tongue R is attached to the axle-tree, but in such a manner that it can move up and down, but not sideways.

A standard, S, is provided, with pins to hold the levers G and L.

There is also a seat, T, for the driver.

What I claim as my invention, and desire to secure by Letters Patent, is—

1. The combination of the lever G, shaft F, roller H, and apron I, with the lever L, plow K, apron-frame J, and shoe M, substantially as and for the purpose described.

2. The combination of the wheels C C', frame A, beam K, double brace N, guide O, and brace P, substantially as and for the purpose described.

JOHN MARSH.

Witnesses:
E. ROSE,
ASA CROSIAR.